UNITED STATES PATENT OFFICE.

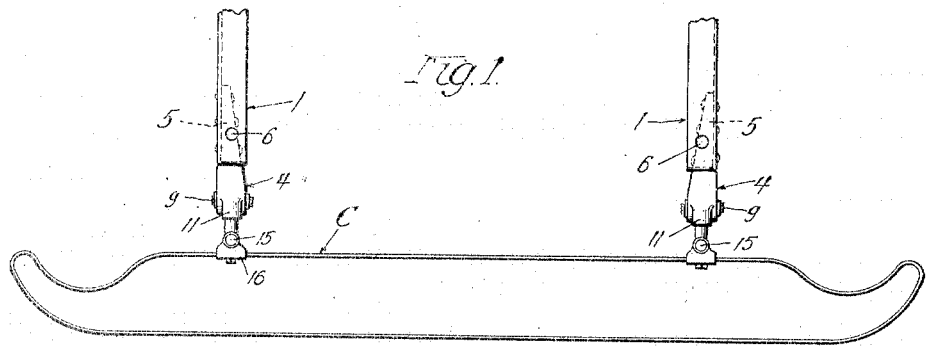
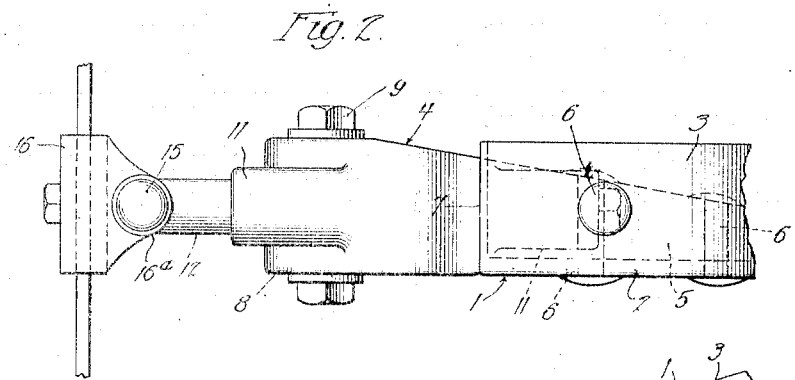
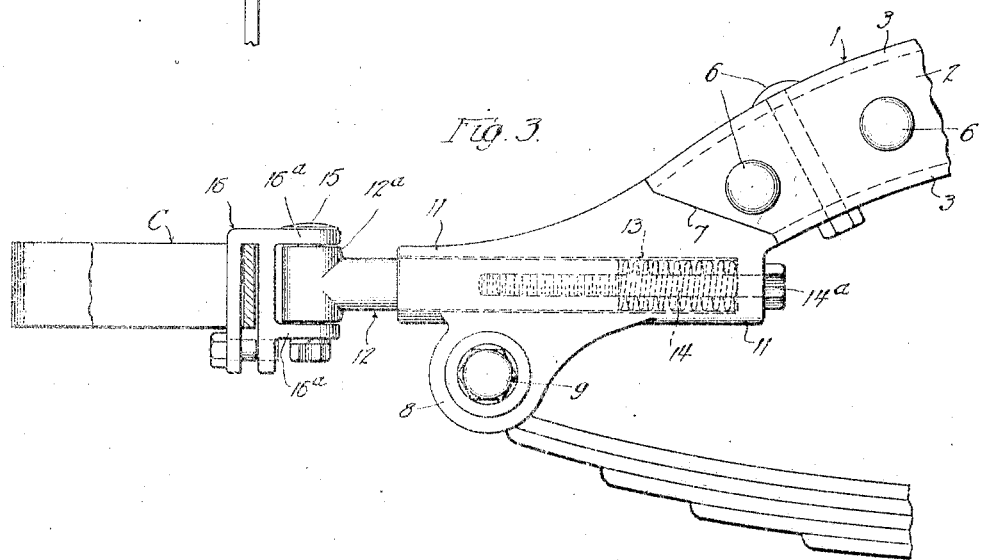

ALLAN L. McGREGOR, OF CHICAGO, ILLINOIS.

BUMPER-ATTACHING FITTING.

1,372,158.

Specification of Letters Patent.   Patented Mar. 22, 1921.

Application filed January 17, 1921. Serial No. 437,738.

*To all whom it may concern:*

Be it known that I, ALLAN L. McGREGOR, a citizen of the United States, and a resident of Chicago, in the county of Cook and State of Illinois, have invented certain new and useful Improvements in Bumper-Attaching Fittings, of which the following is a specification.

This invention relates to improvements in bumper attaching fittings designed especially for the attachment of bumpers to the frame members of motor vehicles.

The object of the present invention is to provide a construction for a fitting which may be built into the frame of a motor vehicle, thereby affording a means for the ready connection of bumpers, which otherwise are applied by the use of connecting members such as clamping devices, bolts, and the like. In short, it is proposed to incorporate a bumper attaching member into a vehicle frame as an integral part thereof.

In the drawings is illustrated a preferred construction for a fitting embodying the invention, and which may be briefly described as follows:

Figure 1 is a top plan view of the forward ends of the frame members of a motor vehicle, with a bumper supported by means of the fittings, Fig. 2 is an enlarged top plan view of the fitting, and Fig. 3 is an enlarged view in side elevation of the fitting and bumper.

As a suitable bumper that may be attached to a vehicle is disclosed the familiar type of resilient bar bumper, consisting of a front impact member A, having end portions B—B bent rearwardly and inwardly in U-shape, and a rearwardly spaced member C having direct connection with the attaching fittings about to be described in detail.

The frame members 1—1 of a motor vehicle ordinarily have the form of channel bars, consisting of a vertical web 2, and horizontal webs 3—3. The usual practice is to shape the ends of the frame members to provide heads or cylindric extremities forming a support for the pivot bolt connecting the ends of the springs with the ends of the frame members. In adapting the fitting of the invention to a frame member (it being understood that the two members 1—1 are threaded in like manner) the frame member is cut short, eliminating the usual frame head, and terminating in an oblique end of U-shaped contour, as shown in Fig. 3.

The fitting, which is to be understood as a forged or cast metal member adapted to replace the usual end formation of a frame member, comprises a body portion 4 and a shank portion 5, the latter conforming generally to the channel of the frame member, and adapted to lie therein in flatwise contact with the horizontal and vertical webs 2 and 3. The shank is preferably tapered toward its rear end, and as a means for permanently connecting the fitting to the end of the frame member, a suitable number of rivets 6 are inserted through the webs of the frame member, and the shank portion 5 of the fitting. The body portion 4 extends beyond the end of the frame member, and the base of the shank portion 5, there being formed a shoulder as at 7 (Figs. 2 and 3) against which the end of the frame member abuts.

The body portion 4 extends forwardly and downwardly, following the usual curvature of the frame end, and terminating at its end in a cylindric head 8, in the nature of a housing supporting a spring bolt 9, and the looped end of the upper leaf of the spring 10, in accordance with the standard practice. Intermediate the head 8 and the base of the shank portion 5, is a horizontally disposed cylindric formation projecting forwardly and rearwardly from the body portion, as at 11—11. This cylindric part is based out from the forward end to a point just short of the rear end, thereby forming a tubular housing within which is retained a plunger rod 12, extending outwardly from the front end. At the rear of the tubular housing is mounted a coiled compression spring 13 surrounding a bolt 14 tapped into the rear end of the plunger rod and terminating in a head 14ª outside of the housing. At the forward end of the plunger rod is formed a cylindric knuckle 12ª supporting a vertical pivot bolt 15. Connected to the knuckle by means of said bolt 15 is a clamping block 16 of U-shape, having integral ears 16ª—16ª through which the ends of the bolt extend. The block has clamping engagement with the rear bar C of the bumper, and pivotal connection with the end of the plunger rod 12.

The construction so far as the supporting of the bumper is concerned, is obvious;

namely, the pivotal connection at the ends of the plunger rods 12—12, which in turn are yieldably held within the tubular housing of the fitting, the manifest function of the plunger rods and co-acting springs 13 being to pivotally absorb the impacts received by the bumper, and transmitted through the connections to the plunger rod. The advantage of a fitting, including in addition to the head 8 the tubular housing for a yieldable plunger rod forming a part of the fitting, is also obvious; namely, the combining in a single member the necessary support for a bumper, as well as the spring connection. In this manner, the application of a bumper is not a matter of attachment by means, best suited for the purpose, but a certain and standard operation which makes a bumper an integral part of the vehicle.

Having described the device of the invention, I claim as new and useful:

1. A bumper attaching fitting comprising a shank adapted to be fixed to the end of a vehicle frame member, a portion projecting beyond the end of said frame member, and adapted for connection with a vehicle spring and an integral tubular portion formed in said projecting portion, and a plunger mounted on said tubular portion and adapted to support a bumper at the end thereof.

2. A bumper attaching fitting comprising a shank adapted to be fixed to the end of a vehicle frame member, a head formed at the projecting end of said shank, an integral tubular portion intermediate said head and shank, and a plunger mounted on said tubular portion and adapted to support a bumper at the end thereof.

3. A bumper attaching fitting adapted to be mounted at one end of a vehicle frame member, and comprising a shank portion fitting within the end of the frame member, and a portion extending beyond the end thereof and shaped to provide a head having pivotal connection with the vehicle spring, and a tubular housing, and a plunger mounted in said housing and supporting a bumper at one end thereof.

4. A bumper attaching fitting adapted to be mounted at one end of a vehicle frame member, and comprising a shank portion fitting within the end of the frame member, and a portion extending beyond the end thereof, shaped to provide a head having pivotal connection with the vehicle spring, and horizontal tubular portions forming a housing, and a spring plunger mounted in said housing and supporting a bumper at one end thereof.

5. A bumper attaching fitting adapted to be mounted at one end of a vehicle frame member of channel shape, and comprising a tapered shank portion having permanent connection with said frame member, and enlarged body portion extending from the base of said shank beyond the end of said frame member, said body portion being shaped to form a head for supporting the end of a vehicle spring, and a tubular housing, and a plunger and spring mounted within said housing, the projecting end of said plunger being adapted to have a bumper connected thereto.

In witness whereof, I hereunto subscribe my name this 11th day of January, A. D. 1921.

ALLAN L. McGREGOR.